US012196146B2

(12) United States Patent
Itaba et al.

(10) Patent No.: US 12,196,146 B2
(45) Date of Patent: Jan. 14, 2025

(54) FUEL INJECTION CONTROL DEVICE

(71) Applicant: Hitachi Astemo, Ltd., Hitachinaka (JP)

(72) Inventors: Fumihiro Itaba, Hitachinaka (JP); Osamu Mukaihara, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/281,996

(22) PCT Filed: Jan. 25, 2022

(86) PCT No.: PCT/JP2022/002725
§ 371 (c)(1),
(2) Date: Sep. 14, 2023

(87) PCT Pub. No.: WO2022/239309
PCT Pub. Date: Nov. 17, 2022

(65) Prior Publication Data
US 2024/0151189 A1  May 9, 2024

(30) Foreign Application Priority Data
May 11, 2021  (JP) ................................. 2021-080316

(51) Int. Cl.
*F02D 41/20* (2006.01)
*F02D 41/30* (2006.01)
*F02M 51/06* (2006.01)

(52) U.S. Cl.
CPC ............. *F02D 41/20* (2013.01); *F02D 41/30* (2013.01); *F02M 51/061* (2013.01)

(58) Field of Classification Search
CPC ........ F02D 41/20; F02D 41/30; F02M 51/061
See application file for complete search history.

(56) References Cited

U.S. PATENT DOCUMENTS 6,047,682 A * 4/2000 Fujino ................. F02D 41/3836
123/357
2017/0051696 A1  2/2017  Mukaihara et al.
(Continued)

FOREIGN PATENT DOCUMENTS

JP    2007177659 A  *  7/2007
JP      4635865 B2  *  2/2011
(Continued)

OTHER PUBLICATIONS

International Preliminary Report on Patentability (PCT/IB/338 & PCT/IB/373) issued in PCT Application No. PCT/JP2022/002725 dated Nov. 23, 2023, including English translation of Written Opinion (PCT/ISA/237) (6 pages).
(Continued)

Primary Examiner — Joseph J Dallo
(74) Attorney, Agent, or Firm — Crowell & Moring LLP

(57) ABSTRACT

An object of the present invention is to provide a fuel injection control device capable of improving the execution frequency and accuracy of individual difference detection of a plurality of fuel injection valves. Therefore, the fuel injection control device 127 is configured to measure, as a valve closing time, a time from when energization of the solenoid 407 is finished to when the valve body 402 moves to the valve closing position for each of the plurality of fuel injection valves 105; divide an energization time of the solenoid 407 into a plurality of sections 1001 to 1004; calculate, as an average valve closing time, an average value of the valve closing times measured a plurality of times, in each of the plurality of sections 1001 to 1004; calculate a specific valve closing time based on the average valve closing time of at least one section among the plurality of sections 1001 to 1004; and correct the energization time
(Continued)

according to the specific valve closing time of each of the plurality of fuel injection valves 105.

7 Claims, 6 Drawing Sheets

(56) References Cited

U.S. PATENT DOCUMENTS

| | | | |
|---|---|---|---|
| 2017/0062110 A1* | 3/2017 | Matsumoto | ......... F02D 41/1408 |
| 2018/0195450 A1 | 7/2018 | Mukaihara et al. | |
| 2021/0123393 A1 | 4/2021 | Itaba et al. | |
| 2022/0010747 A1 | 1/2022 | Itaba et al. | |

FOREIGN PATENT DOCUMENTS

| | | | | |
|---|---|---|---|---|
| JP | 6132952 B1 * | 5/2017 | ............ | B60W 10/06 |
| JP | 2018-109411 A | 7/2018 | | |
| JP | 2018-112120 A | 7/2018 | | |
| WO | WO-9632580 A1 * | 10/1996 | ............. | F02D 41/20 |
| WO | WO-0233241 A1 * | 4/2002 | ............. | F02D 41/20 |
| WO | WO-2005026515 A2 * | 3/2005 | ............. | F02D 41/34 |
| WO | WO-2005026519 A2 * | 3/2005 | ........... | F02D 41/062 |
| WO | WO-2015071686 A1 * | 5/2015 | ............. | F02D 41/20 |
| WO | WO 2017/006814 A1 | 1/2017 | | |
| WO | WO-2017022479 A1 * | 2/2017 | ............. | F02D 41/20 |
| WO | WO-2018042909 A1 * | 3/2018 | ............. | F02D 41/20 |
| WO | WO 2019/225076 A1 | 11/2019 | | |
| WO | WO 2020/129631 A1 | 6/2020 | | |

OTHER PUBLICATIONS

International Search Report (PCT/ISA/210) issued in PCT Application No. PCT/JP2022/002725 dated Mar. 22, 2022 with English translation (4 pages).

Japanese-language Written Opinion (PCT/ISA/237) issued in PCT Application No. PCT/JP2022/002725 dated Mar. 22, 2022 with English translation (7 pages).

\* cited by examiner

FUEL INJECTION CONTROL DEVICE

TECHNICAL FIELD

The present invention relates to a fuel injection control device.

BACKGROUND ART

In recent years, it has been required to simultaneously achieve low fuel consumption and high output of an internal combustion engine. As one of means for achieving this, expansion of a dynamic range of a fuel injection valve has been required. In order to expand the dynamic range of the fuel injection valve, it is necessary to improve dynamic flow characteristics while securing static flow characteristics in the related art. As a method for improving the dynamic flow characteristics, reduction of the minimum injection amount by partial lift control is known.

For example, PTL 1 discloses, as a control device that controls an operation of a fuel injection valve, a control device that detects individual difference information of the fuel injection valve and varies a drive current for each fuel injection valve when energization control of the fuel injection valve is performed based on the detected individual difference information.

In the control device disclosed in PTL 1, whether the peak current of the drive current common to all the fuel injection valves assembled in the internal combustion engine for opening the fuel injection valve is excessively supplied or insufficient is determined based on the detected individual difference information, and the valve opening force at the time of valve opening is optimized by reducing or increasing the drive current. In addition, a reverse voltage is applied immediately after a peak current is applied, and the current energized to the fuel injection valve is rapidly pulled out, so that the acceleration of the valve body immediately before the valve opening is completed is reduced, and the valve body bouncing after the valve opening is completed is reduced.

In addition, in the control device disclosed in PTL 2, a method of highly accurately detecting the individual difference of the fuel injection valve by prohibiting the individual difference detection under the operating condition of the internal combustion engine that affects the individual difference detection result in the individual difference detection of the fuel injection valve is disclosed.

CITATION LIST

Patent Literature

PTL 1: JP 2018-109411 A
PTL 2: WO 2017/006814

SUMMARY OF INVENTION

Technical Problem

In the control device of the fuel injection valve disclosed in PTL 2, when the fuel pressure of the common rail that supplies fuel to the fuel injection valve fluctuates by a set value or more within a set time, the valve closing time changes, so that the execution of the individual difference detection is prohibited, and the individual difference detection is executed only when the fuel pressure fluctuation is small. In addition, when an injection pulse width representing the energization time to the fuel injection valve is equal to or less than the predetermined time width, a valve body of the fuel injection valve is not stabilized and the valve closing time changes. Therefore, the execution of the individual difference detection is permitted only when the injection pulse width is equal to or more than the predetermined time.

However, as the injection pulse width for permitting the execution of the individual difference detection is made longer, the frequency of a state in which the individual difference detection can be executed during the operation of the internal combustion engine decreases, and the individual difference detection may not proceed. On the other hand, as the injection pulse width for permitting the execution of the individual difference detection is shortened, the frequency of a state in which the individual difference detection can be executed during the operation of the internal combustion engine increases, but the variation in the individual difference detection of the fuel injection valve increases, and the accuracy may deteriorate. Furthermore, even if the valve body of the fuel injection valve is stable, the valve closing time changes depending on whether or not a holding current for holding the valve body at a full lift position when stopping the energization of the fuel injection valve is energized and whether or not a movable core that pushes up the valve body is stable, and there is a possibility that the accuracy of individual difference detection deteriorates.

The present invention has been made in view of the above problems, and an object thereof is to provide a fuel injection control device capable of improving the execution frequency and accuracy of individual difference detection of a plurality of fuel injection valves.

Solution to Problem

In order to achieve the above object, the present invention provides a fuel injection control device that controls a plurality of fuel injection valves in which a valve body moves from a valve closing position to a valve opening position by energizing a solenoid, wherein the device is configured to measure, as a valve closing time, a time from when energization of the solenoid is finished to when the valve body moves to the valve closing position for each of the plurality of fuel injection valves; divide an energization time of the solenoid into a plurality of sections; calculate, as an average valve closing time, an average value of the valve closing times measured a plurality of times in each of the plurality of sections; calculate a specific valve closing time based on the average valve closing time of at least one section among the plurality of sections; and correct the energization time according to the specific valve closing time of each of the plurality of fuel injection valves.

According to the present invention configured as described above, the energization time of the solenoid of each fuel injection valve is divided into a plurality of sections, the specific valve closing time of each fuel injection valve is calculated based on at least one of the average valve closing times of the sections, and the variation in the specific valve closing time of each fuel injection valve is detected as the individual difference of the fuel injection valve. As a result, the execution frequency and the accuracy of the individual difference detection of the plurality of fuel injection valves can be improved.

Advantageous Effects of Invention

According to the fuel injection control device of the present invention, the execution frequency and the accuracy of the individual difference detection of the plurality of fuel injection valves can be improved.

DESCRIPTION OF EMBODIMENTS

Figure 1:
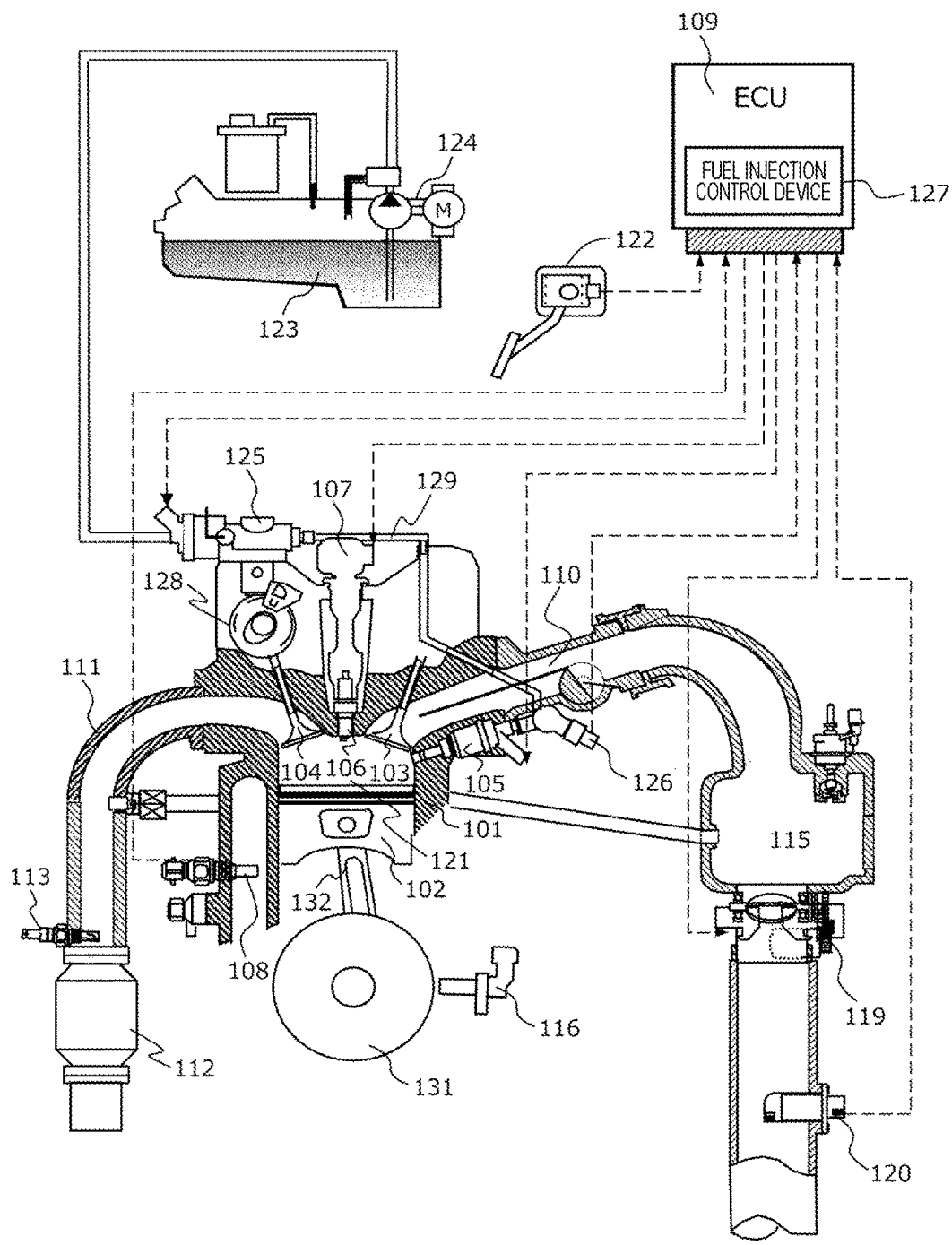
FIG. 1 is a schematic overall configuration diagram illustrating a basic configuration example of an internal combustion engine system on which a fuel injection control device according to an embodiment of the present invention is mounted.

Hereinafter, an embodiment of the present invention will be described with reference to the accompanying drawings. In the present specification and the accompanying drawings, components having substantially the same function or configuration are denoted by the same reference numerals, and redundant description is omitted.

First, a configuration of an internal combustion engine system equipped with a fuel injection control device according to the present embodiment will be described. FIG. 1 is an overall configuration diagram of an internal combustion engine system equipped with a fuel injection control device according to an embodiment.

An internal combustion engine (engine) 101 illustrated in FIG. 1 is a four-cycle engine that repeats four strokes of a suction stroke, a compression stroke, a combustion (expansion) stroke, and an exhaust stroke, and is, for example, a multi-cylinder engine including four cylinders (cylinders). Note that the number of cylinders included in the internal combustion engine 101 is not limited to four, and may include six or eight or more cylinders.

The internal combustion engine 101 includes a piston 102, an intake valve 103, and an exhaust valve 104. The intake air (intake air) of the internal combustion engine 101 passes through an air flow meter (AFM) 120 that detects the amount of air flowing in, and a flow rate thereof is adjusted by a throttle valve 119. The air that has passed through the throttle valve 119 is sucked into the collector 115 that is a branch portion, and then supplied to a combustion chamber 121 of each cylinder via an intake pipe 110 and the intake valve 103 provided for each cylinder (cylinder).

On the other hand, the fuel is supplied from a fuel tank 123 to a high-pressure fuel pump 125 by a low-pressure fuel pump 124, and is increased to a pressure necessary for fuel injection by the high-pressure fuel pump 125. That is, the high-pressure fuel pump 125 moves a plunger provided in the high-pressure fuel pump 125 up and down by power transmitted from an exhaust camshaft (not illustrated) of an exhaust cam 128, and pressurizes (boosts) the fuel in the high-pressure fuel pump 125.

An on-off valve driven by a solenoid is provided in a suction port of the high-pressure fuel pump 125, and the solenoid is connected to a fuel injection control device 127 provided in an engine control unit (ECU) 109 which is an electronic control device. The fuel injection control device 127 controls a solenoid based on a control command from the ECU 109, and drives an on-off valve so that the pressure of the fuel discharged from the high-pressure fuel pump 125 (hereinafter, abbreviated as "fuel pressure") becomes a desired pressure. The ECU 109 (fuel injection control device 127) includes, for example, a CPU, a memory, and an input/output interface (not illustrated).

The CPU is a processor that performs arithmetic processing. The memory is a storage unit including a volatile or nonvolatile semiconductor memory or the like. The memory may store a computer program for controlling the fuel injection valve 105. In this case, the CPU reads and executes the computer program recorded in the memory, thereby realizing all or a part of the functions of the fuel injection control device 127. An ignition switch signal for commanding start (ignition) of the internal combustion engine 101 is input to the ECU 109. For example, when detecting that the ignition switch signal is on, the CPU starts processing of a computer program of fuel injection control. Instead of the CPU, another arithmetic processing unit such as a micro processing unit (MPU) may be used.

The fuel boosted by the high-pressure fuel pump 125 is sent to the fuel injection valve 105 via the high-pressure fuel pipe 129. The fuel injection valve 105 directly injects fuel into the combustion chamber 121 based on a command from the fuel injection control device 127. The fuel injection valve 105 is an electromagnetic valve that injects fuel by operating a valve body when a drive current is supplied (energized) to a solenoid (electromagnetic coil) to be described later.

The internal combustion engine 101 is provided with a fuel pressure sensor 126 that measures the fuel pressure in the high-pressure fuel pipe 129. The ECU 109 transmits a control command for setting the fuel pressure in the high-pressure fuel pipe 129 to a desired pressure to the fuel injection control device 127 based on the measurement result of the fuel pressure sensor 126. That is, the ECU 109 performs so-called feedback control to set the fuel pressure in the high-pressure fuel pipe 129 to a desired pressure.

Furthermore, each combustion chamber 121 of the internal combustion engine 101 is provided with an ignition plug 106, an ignition coil 107, and a water temperature sensor 108. The ignition plug 106 exposes an electrode portion in the combustion chamber 121, and ignites an air-fuel mixture in which the intake air and the fuel are mixed in the combustion chamber 121 by discharge. The ignition coil 107 creates a high voltage for discharging at the ignition plug 106. The water temperature sensor 108 measures the temperature of the cooling water for cooling the cylinder of the internal combustion engine 101.

The ECU 109 performs energization control of the ignition coil 107 and ignition control by the ignition plug 106. The air-fuel mixture in which the intake air and the fuel are mixed in the combustion chamber 121 is burned by a spark emitted from the ignition plug 106, and the piston 102 is pushed down by this pressure.

The exhaust gas generated by the combustion is discharged to the exhaust pipe 111 through the exhaust valve 104. The exhaust pipe 111 is provided with a three-way catalyst 112 and an oxygen sensor 113. The three-way catalyst 112 purifies harmful substances such as nitrogen oxides (NOx) contained in the exhaust gas. The oxygen sensor 113 detects the oxygen concentration contained in the exhaust gas and outputs the detection result to the ECU 109. The ECU 109 performs feedback control based on the detection result of the oxygen sensor 113 so that the fuel injection amount supplied from the fuel injection valve 105 becomes a target air-fuel ratio.

A crank shaft 131 is connected to the piston 102 via a connecting rod 132. Then, the reciprocating motion of the piston 102 is converted into a rotational motion by the crank shaft 131. A crank angle sensor 116 is attached to the crank shaft 131. The crank angle sensor 116 detects the rotation and the phase of the crank shaft 131 and outputs the detection result to the ECU 109. The ECU 109 can detect the rotational speed of the internal combustion engine 101 based on the output of the crank angle sensor 116.

Signals from a crank angle sensor 116, an air flow meter 120, an oxygen sensor 113, an accelerator opening sensor 122 indicating an opening of an accelerator operated by a driver, a fuel pressure sensor 126, and the like are input to the ECU 109.

The ECU 109 calculates a required torque of the internal combustion engine 101 based on a signal supplied from the accelerator opening sensor 122, and determines whether or not the engine is in an idle state. Further, the ECU 109 calculates an intake air amount necessary for the internal combustion engine 101 from the required torque and the like, and outputs an opening degree signal corresponding thereto to the throttle valve 119.

In addition, the ECU 109 includes a rotation speed detection unit that detects the rotation speed (hereinafter, referred to as an engine speed) of the internal combustion engine 101 based on the signal supplied from the crank angle sensor 116. Furthermore, the ECU 109 includes a warm-up determination unit that determines whether the three-way catalyst 112 is in a warm-up state from the temperature of the cooling water obtained from the water temperature sensor 108, the elapsed time after the start of the internal combustion engine 101, and the like.

The fuel injection control device 127 calculates a fuel amount corresponding to the intake air amount, and outputs a fuel injection signal corresponding thereto to the fuel injection valve 105. Further, the fuel injection control device 127 outputs an energization signal to the ignition coil 107 and outputs an ignition signal to the ignition plug 106.

Next, a configuration of the fuel injection control device 127 illustrated in FIG. 1 will be described with reference to FIGS. 2 and 3.

Figure 2:
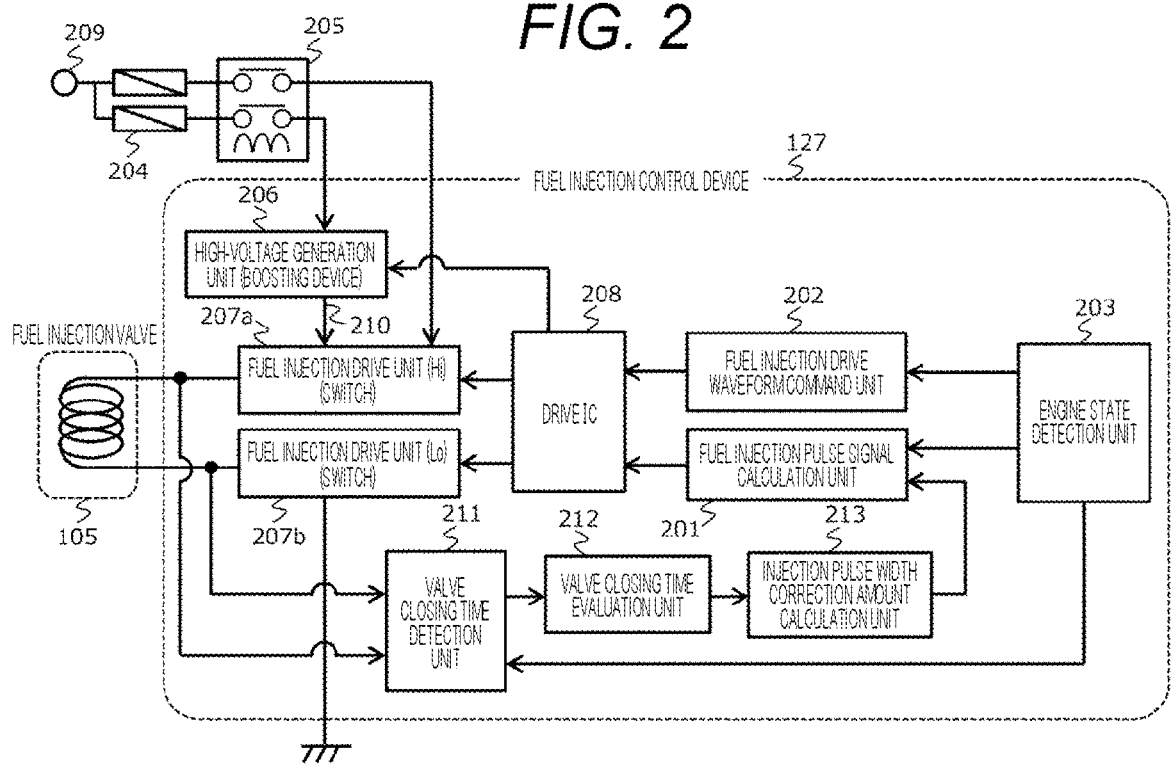
FIG. 2 is a schematic configuration diagram illustrating a fuel injection control device according to an embodiment of the present invention.

FIG. 2 is a schematic configuration diagram illustrating the fuel injection control device 127. FIG. 3 is a diagram illustrating a configuration example of a fuel injection drive unit illustrated in FIG. 2.

As illustrated in FIG. 2, the fuel injection control device 127 includes a fuel injection pulse signal calculation unit 201 and a fuel injection drive waveform command unit 202 as fuel injection control units, an engine state detection unit 203, and a drive IC 208. In addition, the fuel injection control device 127 includes a high-voltage generation unit (boosting device) 206, fuel injection drive units 207a and 207b, a valve closing time detection unit 211, a valve closing time evaluation unit 212, and an injection pulse width correction amount calculation unit 213.

The engine state detection unit 203 collects and provides various types of information such as the engine speed, the intake air amount, the coolant temperature, the fuel pressure, and the failure state of the internal combustion engine 101 described above.

The fuel injection pulse signal calculation unit 201 calculates an injection pulse width that defines a fuel injection period of the fuel injection valve 105 for realizing fuel injection with the required injection amount based on various information including the required injection amount obtained from the engine state detection unit 203. Since the injection pulse width is determined from the characteristics of the reference fuel injection valve (for example, a central part of design variation), an injection pulse width correction amount for each cylinder calculated by an injection pulse width correction amount calculation unit 213 to be described later is added and output to the drive IC 208.

The fuel injection drive waveform command unit 202 calculates a command value of a drive current supplied for opening and maintaining the valve opening of the fuel injection valve 105 based on various information including the fuel pressure obtained from the engine state detection unit 203, and sets the command value in the drive IC 208 via serial communication or the like.

The battery voltage 209 is supplied to the high-voltage generation unit 206 via a fuse 204 and a relay 205. The high-voltage generation unit 206 generates a high power supply voltage 210 (VH) necessary for opening the electromagnetic fuel injection valve 105 based on the battery voltage 209. Hereinafter, the power supply voltage 210 is referred to as a high voltage 210. As a power source of the fuel injection valve 105, two systems of a high voltage 210 for securing a valve opening force of the valve body and a battery voltage 209 for holding the valve opening so as not to close the valve body after the valve is opened are provided.

The fuel injection drive unit 207a (switch unit) is provided on the upstream side (power supply side) of the fuel injection valve 105, and supplies a high voltage 210 necessary for opening the fuel injection valve 105 to the fuel injection valve 105. After opening the fuel injection valve 105, the fuel injection drive unit 207a supplies the battery voltage 209 necessary for maintaining the open state of the fuel injection valve 105 to the fuel injection valve 105.

Figure 3:
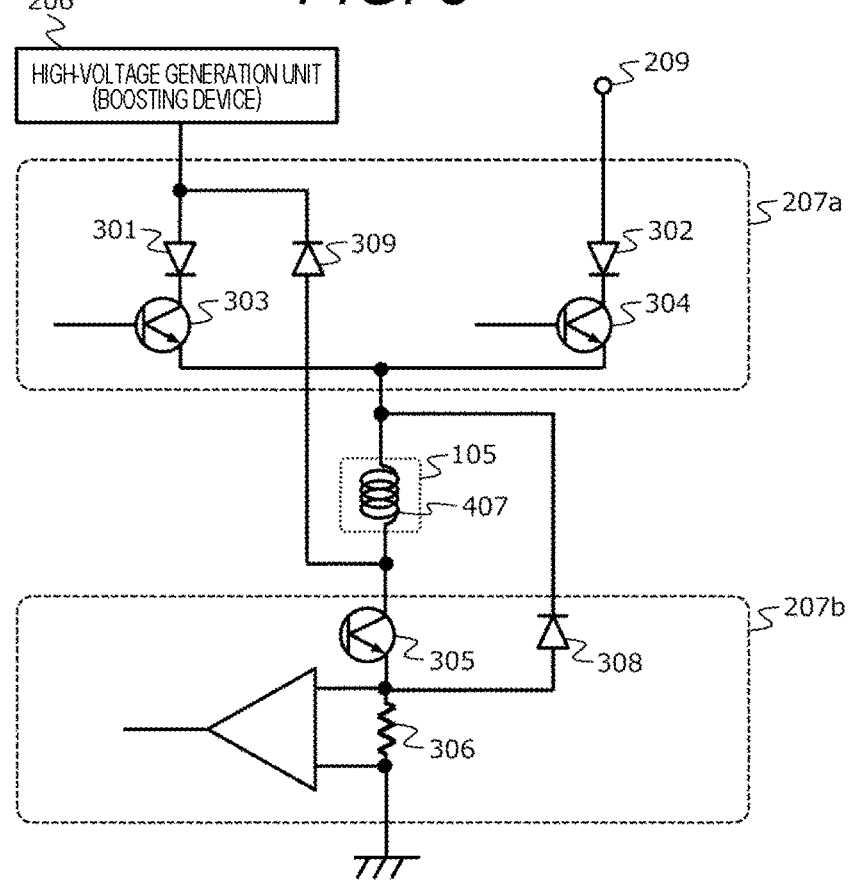
FIG. 3 is a diagram illustrating a configuration example of a fuel injection drive unit illustrated in FIG. 2.

As illustrated in FIG. 3, the fuel injection drive unit 207a includes diodes 301 and 302, a high-voltage side switching element 303, and a low-voltage side switching element 304. The fuel injection drive unit 207a supplies the high voltage 210 supplied from the high-voltage generation unit 206 to the fuel injection valve 105 using the high-voltage side switching element 303 through a diode 301 provided to prevent current backflow.

In addition, the fuel injection drive unit 207a supplies the battery voltage 209 supplied via the relay 205 to the fuel injection valve 105 using the low-voltage side switching element 304 through the diode 302 provided to prevent current backflow.

The fuel injection drive unit 207b (switch unit) is provided on the downstream side (ground side) of the fuel injection valve 105, and includes a switching element 305 and a shunt resistor 306. The fuel injection drive unit 207b applies the power supplied from the fuel injection drive unit 207a on the upstream side to the fuel injection valve 105 by turning on the switching element 305. In addition, the fuel injection drive unit 207b detects the current consumed in the fuel injection valve 105 by the shunt resistor 306.

The drive IC 208 illustrated in FIG. 2 controls the fuel injection drive units 207a and 207b based on the injection pulse width calculated by the fuel injection pulse signal calculation unit 201 and the drive current waveform (drive current profile) calculated by the fuel injection drive waveform command unit 202. That is, the drive IC 208 controls the high voltage 210 and the battery voltage 209 applied to the fuel injection valve 105, and controls the drive current supplied to the fuel injection valve 105.

The diode 309 is connected in the forward direction between the downstream side of the solenoid 407 (refer to FIG. 4) and the high-voltage generation unit 206, and the diode 308 is connected in the forward direction between the shunt resistor 306 and the upstream side of the solenoid 407. When the high-voltage side switching element 303, the low-voltage side switching element 304, and the switching element 305 are turned off, the diode 308 and the diode 309 are energized by the counter electromotive force generated in the solenoid 407 of the fuel injection valve 105. As a result, the current is fed back to the high-voltage generation unit 206 side, and the drive current supplied to the solenoid 407 rapidly decreases. At this time, a voltage (−VH) having a magnitude corresponding to, for example, the high voltage 210 and a reverse polarity is generated as a counter electromotive force between the terminals of the solenoid 407.

Returning to FIG. 2, the valve closing time detection unit 211 detects the valve closing time in the fuel injection valve 105 and outputs the valve closing time to the valve closing time evaluation unit 212. The valve closing time evaluation unit 212 calculates the valve closing time based on the energization time of the fuel injection valve 105, and outputs the valve closing time to the injection pulse width correction amount calculation unit 213.

The injection pulse width correction amount calculation unit 213 calculates a correction amount (injection pulse width correction amount) of the ON time (injection pulse width) of the injection pulse signal based on the valve closing time, and outputs the calculated injection pulse width correction amount to the fuel injection pulse signal calculation unit 201.

Next, the configuration of the fuel injection valve 105 will be described with reference to FIG. 4.

Figure 4:
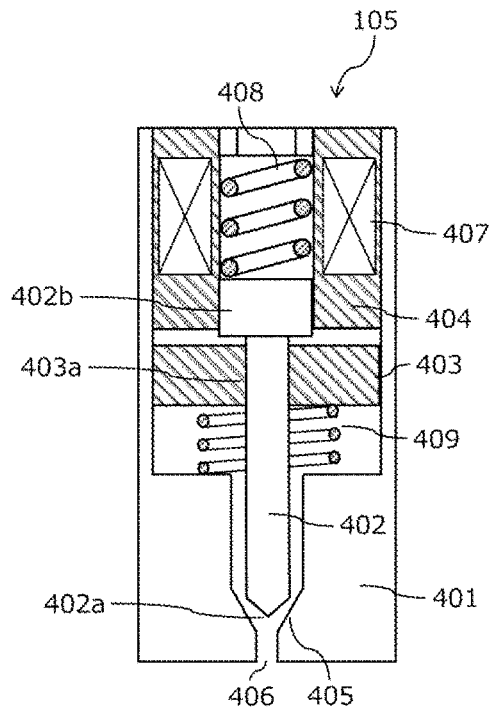
FIG. 4 is a sectional view of a fuel injection valve illustrated in FIG. 1.

FIG. 4 is a sectional view of the fuel injection valve 105.

The fuel injection valve 105 is an electromagnetic fuel injection valve including a normally closed electromagnetic valve. The fuel injection valve 105 includes a housing 401 forming an outer shell, a valve body 402 disposed in the housing 401, a movable core 403, and a fixed core 404. In the housing 401, a valve seat 405 and an injection hole 406 communicating with the valve seat 405 are formed.

The valve body 402 is formed in a substantially rod shape, and a distal end portion 402a as one end is formed in a substantially conical shape. The distal end portion 402a of the valve body 402 faces the valve seat 405 of the housing 401. The fuel injection valve 105 is closed when the distal end portion 402a of the valve body 402 comes into contact with the valve seat 405, and the fuel is not injected from the injection hole 406. Hereinafter, a direction in which the distal end portion 402a of the valve body 402 approaches the valve seat 405 is defined as a valve closing direction, and a direction in which the distal end portion 402a of the valve body 402 separates from the valve seat 405 is defined as a valve opening direction.

The fixed core 404 is formed in a tubular shape and is fixed to an end portion of the housing 401 on a side opposite to the valve seat 405. The other end (rear end) side of the valve body 402 is inserted into a cylindrical hole of the fixed core 404. Inside the fixed core 404, a solenoid 407 is disposed so as to make one round on the other end (rear end) side of the valve body 402.

A set spring 408 that biases the valve body 402 in the valve closing direction is disposed in the cylindrical hole of the fixed core 404. One end of the set spring 408 is in contact with a rear end portion 402b which is the other end of the valve body 402, and the other end of the set spring 408 abuts on the housing 401.

The movable core 403 is disposed between the fixed core 404 and the valve seat 405, and has a circular through hole 403a through which the valve body 402 passes. The rear end portion 402b of the valve body 402 is larger in diameter than the through hole 403a of the movable core 403. Therefore, the periphery of the through hole 403a in the movable core 403 faces the periphery of the rear end portion 402b of the valve body 402.

A zero spring 409 is disposed between the movable core 403 and the housing 401. The zero spring 409 biases the movable core 403 in the valve opening direction. The movable core 403 is disposed at an initial position set between the fixed core 404 and the valve seat 405 by being biased by the zero spring 409.

The inside of the housing 401 is filled with fuel. When no current flows through the solenoid 407, the set spring 408 biases the valve body 402 in the valve closing direction, and presses the valve body 402 in the valve closing direction against the spring load (spring force) of the zero spring 409. As a result, the distal end portion 402a of the valve body 402 abuts on the valve seat 405 to close the injection hole 406.

When a current flows through the solenoid 407, a magnetic flux is generated between the fixed core 404 and the movable core 403, and a magnetic aspiration force acts on the movable core 403. As a result, the movable core 403 is attracted to the fixed core 404 (solenoid 407), and the movable core 403 abuts on the rear end portion 402b of the valve body 402. As a result, the valve body 402 moves in the valve opening direction in conjunction with the movable core 403.

When the valve body 402 moves in the valve opening direction, the distal end portion 402a of the valve body 402 is separated from the valve seat 405, and the injection hole 406 closed by the valve body 402 is opened to inject fuel. After the fuel injection, the movable core 403 returns to the initial position by the balance between the set spring 408 and the zero spring 409.

Next, a method for driving the fuel injection valve 105 will be described with reference to FIG. 5.

Figure 5:
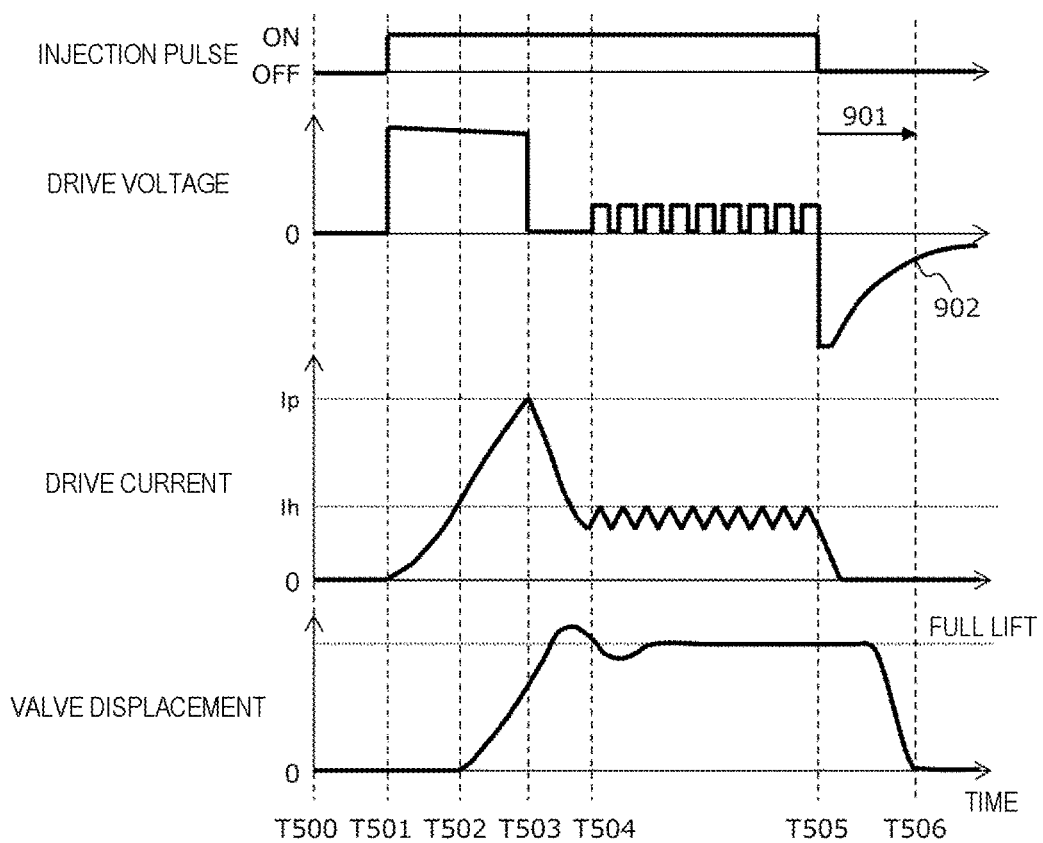
FIG. 5 is a timing chart for explaining a method for driving the fuel injection valve illustrated in FIG. 1.

FIG. 5 is a timing chart for explaining a method for driving the fuel injection valve 105. A horizontal axis represents time, and a vertical axis represents an injection pulse, a drive voltage, a drive current, and a valve displacement.

FIG. 5 illustrates an example of an injection pulse, a drive voltage, a drive current, and a displacement amount (valve displacement) of the valve body 402 in time series when fuel is injected from the fuel injection valve 105. When the fuel injection valve 105 is driven, a current setting value to be described later is set in advance based on the characteristics of the fuel injection valve 105. The injection amount characteristic of the fuel injection valve 105 according to the current setting value is stored in a memory 142 (for example, a RAM (Read Only Memory)) provided in the ECU 109. The fuel injection control device 127 calculates an injection pulse of the fuel injection valve 105 from an operation state of the internal combustion engine 101 and an injection amount characteristic of the fuel injection valve 105.

At times T500 to T501 illustrated in FIG. 5, the injection pulse output from the fuel injection pulse signal calculation unit 201 (refer to FIG. 2) is in an off state. Therefore, the fuel injection drive units 207a and 207b are turned off, and the drive current does not flow through the fuel injection valve 105. Therefore, the valve body 402 is biased in the valve closing direction by the spring load of the set spring 408 of the fuel injection valve 105, the distal end portion 402a of the valve body 402 abuts on the valve seat 405 to close the injection hole 406, and fuel is not injected.

Next, at a time T501, the injection pulse is turned on, and the fuel injection drive unit 207a and the fuel injection drive unit 207b are turned on. As a result, the high voltage 210 is applied to the solenoid 407, and a drive current flows through the solenoid 407. When a drive current flows through the solenoid 407, a magnetic flux is generated between the fixed core 404 and the movable core 403, and a magnetic aspiration force acts on the movable core 403.

When the magnetic aspiration force acts on the movable core 403, the movable core 403 starts to move in the valve opening direction (times T501 to T502). Thereafter, when the movable core 403 moves by a predetermined distance, the movable core 403 and the valve body 402 start to move integrally (time T502), and the fuel injection valve 105 is opened as the valve body 402 moves away from the valve seat 405. As a result, the fuel in the housing 401 is injected from the injection hole 406.

The valve body 402 moves integrally with the movable core 403 until the movable core 403 collides with the fixed core 404. Then, when the movable core 403 collides with the fixed core 404, the movable core 403 is bounced back by the fixed core 404, and the valve body 402 further continues to move in the valve opening direction. Thereafter, when the biasing force by the spring load of the set spring 408 and the pressure of the fuel (fuel pressure) exceeds the magnetic aspiration force, the valve body 402 starts to move in the valve closing direction (hereinafter, referred to as a bouncing operation.). The bouncing operation of the valve body 402 disturbs the flow rate of the fuel injected from the injection hole 406.

Therefore, before the movable core 403 collides with the fixed core 404 (time T503), that is, when the drive current reaches the peak current Ip, the switching elements 303, 304 of the fuel injection drive units 207a and 207b are turned off to reduce the drive current flowing through the solenoid 407. The peak current Ip is one of current setting values set based on the characteristics of the fuel injection valve 105.

Then, from the time T504 to the time T505 when the injection pulse falls, the fuel injection drive unit 207b is maintained in the on state, and the fuel injection drive unit 207a is intermittently turned on. That is, by performing PWM (Pulse Width Modulation) control on the fuel injection drive unit 207a and intermittently setting the drive voltage applied to the solenoid 407 to the battery voltage 209, the drive current flowing through the solenoid 407 falls within a predetermined range. As a result, a magnetic aspiration force of a magnitude necessary for attracting the movable core 403 to the fixed core 404 is generated.

At time T505, the injection pulse is turned off. As a result, the fuel injection drive units 207a and 207b are all turned off, the drive voltage applied to the solenoid 407 decreases, and the drive current flowing through the solenoid 407 decreases. As a result, the magnetic flux generated between the fixed core 404 and the movable core 403 gradually disappears, and the magnetic aspiration force acting on the movable core 403 disappears.

When the magnetic aspiration force acting on the movable core 403 disappears, the valve body 402 is pushed back in the valve closing direction with a predetermined time delay by the spring load of the set spring 408 and the pressing force (biasing force) by the fuel pressure (fuel pressure). Then, at time T506, the valve body 402 is returned to the original position. That is, the distal end portion 402a of the valve body 402 abuts on the valve seat 405, and the fuel injection valve 105 is closed. As a result, fuel is not injected from the injection hole 406.

From the time T505 when the injection pulse is turned off, the residual magnetic force in the fuel injection valve 105 is quickly removed, and the high voltage 210 is supplied in the direction opposite to the direction when the fuel injection valve 105 is driven so that the valve body 402 is closed early.

Figure 6:
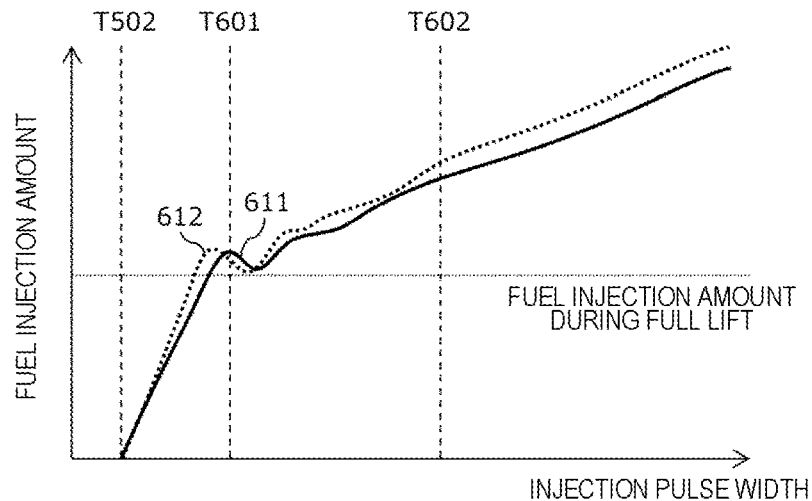
FIG. 6 is a diagram illustrating a relationship between an injection pulse width of the fuel injection valve illustrated in FIG. 1 and a fuel injection amount.

FIG. 6 is a diagram illustrating the relationship between the injection pulse width of the fuel injection valve 105 and the fuel injection amount, in which the horizontal axis represents the injection pulse width and the vertical axis represents the fuel injection amount for each injection pulse width. In addition, the injection amount characteristic 611 indicated by a solid line is set as a reference product, and the injection amount characteristic 612 indicated by a dotted line represents the fuel injection valve 105 in which the spring load of the set spring 408 is smaller than that of the reference product.

As illustrated in FIG. 6, in the case of the fuel injection valve having the injection amount characteristic 611, the lift amount of the valve body 402 increases based on the supply time of the peak current by the high voltage application in the period from the time T502 when the valve body 402 starts to be opened to the time T601 when the valve body 402 reaches the full lift, so that the fuel injection amount increases. The inclination of the fuel injection amount in this period (fuel injection amount increase rate from time T502 to time T601) is determined according to the valve opening speed of the valve body 402. As described above, since the supply power of the peak current is the high voltage 210, the slope of the fuel injection amount is steep.

Thereafter, the movable core 403 collides with the fixed core 404, and the valve body 402 starts the bouncing operation, so that the fuel injection amount is disturbed (from time T601 to time T602). This bouncing operation occurs when the drive current is large with respect to the characteristic variation for each fuel injection valve, the spring load of the set spring 408, and the pressing force due to the pressure of the fuel. Since the valve body 402 after the time T602 when the bouncing operation converges maintains the full lift position, the fuel injection amount has an increasing characteristic of an inclination proportional to the length of the injection pulse.

In the injection amount characteristic 612, the fuel injection amount increase rate when the valve is opened is higher than that of the fuel injection valve of the injection amount characteristic 611, and the bouncing operation is large. In addition, the injection amount is larger than the injection amount characteristic 611 even after the time T602 when the bouncing operation converges. This is because, when the fuel injection valves are driven with the same drive current, the fuel injection valves having a weak spring load of the set spring 408 have a high valve opening speed and a high injection amount increase rate when the valve is opened, and the valve closing speed is reduced after the energization is stopped. Therefore, the injection amount characteristic 612 has a characteristic of being offset to the side where the injection amount is larger than the injection amount characteristic 611.

For the above reason, when the plurality of fuel injection valves are driven with the common drive current and injection pulse width, the injection amount variation occurs in each fuel injection valve.

Next, a method for calculating the injection pulse width correction amount executed by the injection pulse width correction amount calculation unit 213 will be described.

As described with reference to FIG. 6, since the spring load of the set spring 408 of each fuel injection valve varies, the injection amount also varies. That is, since the injection pulse width with respect to the required injection amount calculated by the engine state detection unit 203 is calculated using the injection amount characteristic of the fuel injection valve 105P as a reference such as a variation center product measured in advance, it is necessary to change the injection pulse width for each fuel injection valve in order to reduce the injection amount variation of each fuel injection valve.

The correction of the injection pulse width will be described using the injection amount characteristics of FIG. 7.

Figure 7:
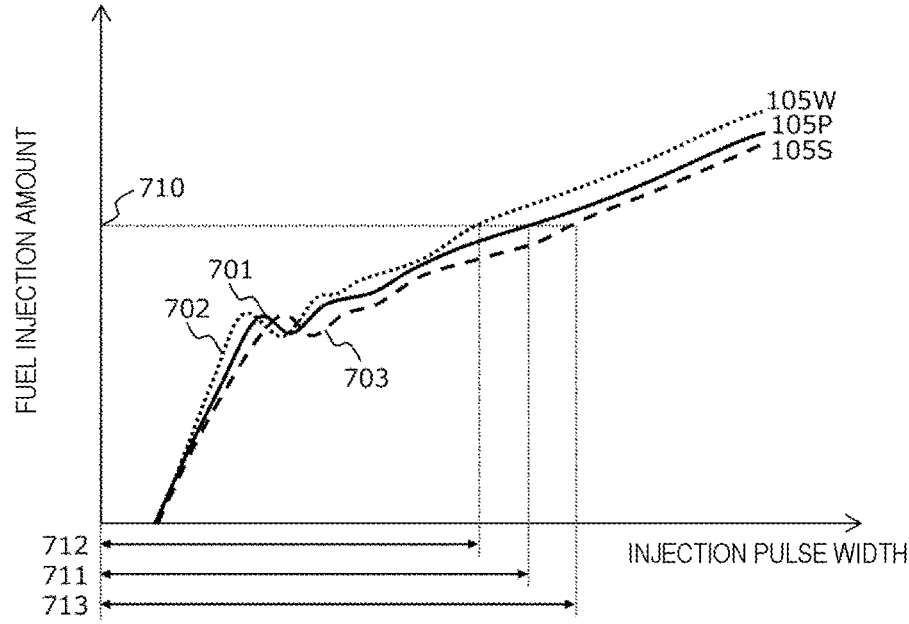
FIG. 7 is a diagram illustrating a relationship between an injection amount characteristic and an injection pulse width correction amount of each fuel injection valve.

FIG. 7 is a diagram illustrating the relationship between the injection pulse width and the fuel injection amount, in which the horizontal axis represents the injection pulse width and the vertical axis represents the fuel injection amount for each injection pulse width. In the drawing, reference numeral 701 denotes an injection amount characteristic (solid line) of a fuel injection valve 105P, reference numeral 702 denotes an injection amount characteristic (broken line) of a fuel injection valve 105W, and reference numeral 703 denotes an injection amount characteristic (dotted line) of a fuel injection valve 105S.

For example, in a case where fuel is injected with a certain required injection amount, when the fuel injection valve 105W having a small spring load of the set spring 408 is driven with the injection pulse width calculated based on an injection amount characteristic 701, the injection amount increases. On the other hand, when the fuel injection valve 105S having a large spring load of the set spring 408 is driven with the injection pulse width calculated based on an injection amount characteristic 701, the injection amount decreases.

That is, in order to adjust the injection amount of each fuel injection valve to the required injection amount 710, it is necessary to shorten the injection pulse width (injection pulse width 712) with respect to the injection pulse width 711 of the reference product (for example, the variation center product) for the fuel injection valve 105W in which the spring load of the set spring 408 is weak. In addition, the fuel injection valve 105S having a strong spring load of the set spring 408 needs to have an injection pulse width (injection pulse width 713) longer than the injection pulse width 711 of the reference product.

Therefore, in the present embodiment, the relation of the injection pulse width correction amount with respect to the valve closing time is measured in advance and stored in the memory, and the injection pulse width is corrected by calculating the injection pulse width correction amount with respect to the measured valve closing time.

Figure 8:
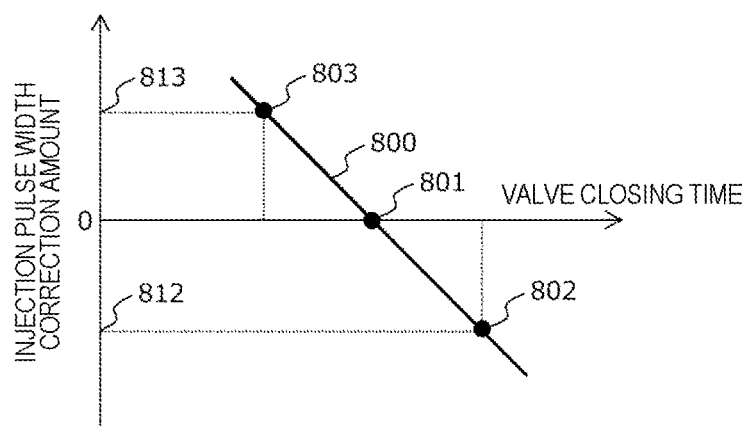
FIG. 8 is a diagram for explaining a relationship between a valve closing time and an injection pulse width correction amount used when the injection pulse width correction is performed.

FIG. 8 illustrates a relationship between the injection pulse width correction amount and the valve closing time.

The valve closing time is measured by a plurality of fuel injection valves 105 in advance by an experiment, and the injection pulse width correction amount is calculated from the injection amount characteristic of the fuel injection valve 105 in which the valve closing time is measured, whereby the relational expression 800 between the valve closing time and the injection pulse width correction amount can be calculated.

For example, when the spring load of the set spring 408 is large, the valve closing time is shortened, and thus, in the case of the fuel injection valve 105S, it is necessary to increase the injection pulse width in order to satisfy the required injection amount. Therefore, the correction value 813 of the injection pulse width for the valve closing time 803 shorter than the reference valve closing time 801 is a positive value. Conversely, when the spring load of the set spring 408 is small, the valve closing time becomes long, and thus, in the case of the fuel injection valve 105W, it is necessary to shorten the injection pulse width in order to satisfy the required injection amount. Therefore, the correction value 812 of the injection pulse width for the valve closing time 802 longer than the reference valve closing time 801 is a negative value.

The relational expression 800 can be calculated by approximating the valve closing time of the plurality of fuel injection valves 105 and the data of the injection pulse width correction amount by a least squares method or the like. Although FIG. 8 illustrates an approximate straight line for the required injection amount 710 of FIG. 7, it is possible to calculate the injection pulse width according to the injection amount characteristic by calculating the approximate straight line for a plurality of required injection amounts. In addition, since the injection amount characteristic changes not only by the solid difference of the fuel injection valve but also by the fuel pressure, the injection pulse width correction amount with respect to the reference injection pulse width may be calculated for each specific fuel pressure.

Since the relational expression 800 calculated above is the fuel pressure representative point, the injection pulse width correction amount with respect to the actual fuel pressure (for example, the fuel pressure measured by the fuel pressure sensor) may be calculated by calculating the correction amount of the fuel pressure representative point larger than the actual fuel pressure and the correction amount of the fuel pressure representative point smaller than the actual fuel pressure, and performing linear interpolation between the two points. The same applies to the injection amount, and the injection amount may be calculated by linear interpolation between two points.

Figure 9:
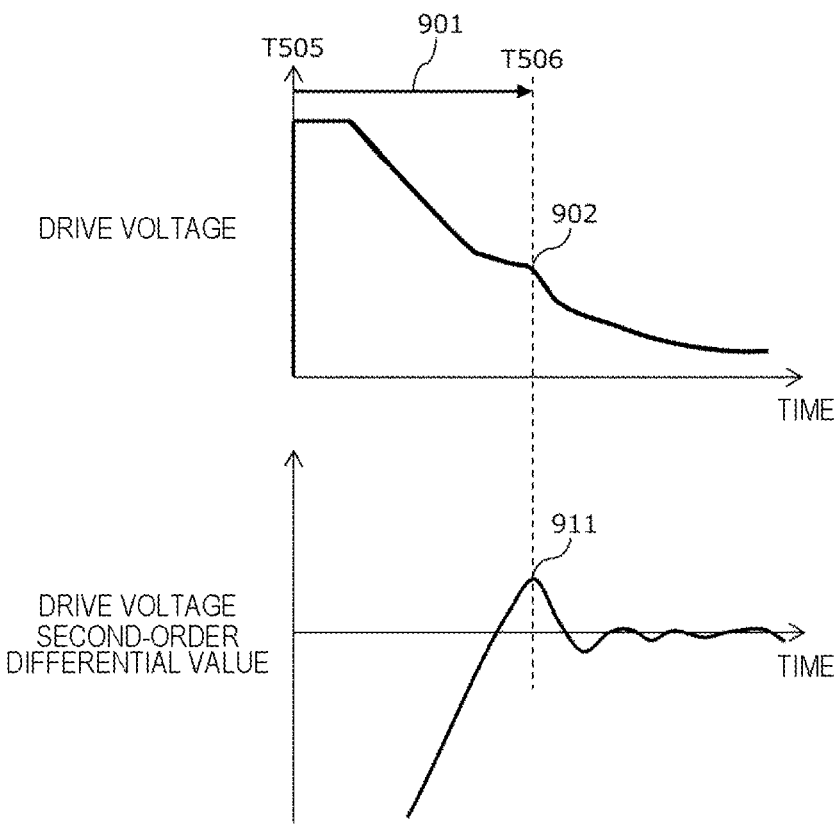
FIG. 9 is a diagram for explaining detection of a valve closing time using a drive voltage in the fuel injection valve illustrated in FIG. 1.

In this manner, the correction amount of the injection pulse width is calculated from the relational expression 800 (refer to FIG. 8) based on the valve closing time calculated by the method illustrated in FIG. 9, and the injection pulse width according to the individual difference of the fuel injection valve 105 can be calculated by adding the correction amount to the injection pulse width 711 (refer to FIG. 7) serving as the reference calculated for the required injection amount 710.

Next, a method of detecting the valve closing time of the fuel injection valve 105 executed by the valve closing time detection unit 211 will be described with reference to FIG. 9.

FIG. 9 is a diagram for explaining the detection of the valve closing time using the drive voltage in the fuel injection valve 105, where the horizontal axis represents the injection pulse width, and the vertical axis represents the second-order differential value of the fuel injection amount and the drive voltage. The valve closing time 901 is defined as an elapsed time from the time when the injection pulse is turned off (time T505) to the time when the valve closing is completed (time T506).

As described above, when the valve body 402 of the fuel injection valve 105 is opened, the high voltage 210 is applied to the solenoid 407, a relatively large drive current flows, and the movable core 403 and the valve body 402 are accelerated. Next, the high voltage 210 applied to the solenoid 407 is cut off, and the drive current flowing through the solenoid 407 decreases to a predetermined value (holding current Ih). The holding current Ih is one of current setting values set based on the characteristics of the fuel injection valve 105.

When the fuel injection valve 105 is closed, when the valve body 402 collides with the valve seat 405, the zero spring 409 changes from extension to compression, the movement direction of the movable core 403 is reversed, the acceleration changes, and the inductance of the solenoid 407 changes. That is, when the fuel injection valve 105 is closed, the drive current flowing through the solenoid 407 is blocked, and the counter electromotive force is applied to the solenoid 407. When the drive current converges, the counter electromotive force also gradually decreases. Therefore, when the counter electromotive force decreases, the inductance of the solenoid 407 changes, so that an inflection point (inflection point 902) is generated in the drive voltage.

The inflection point 902 of the drive voltage appearing when the fuel injection valve 105 is closed is the valve closing timing of the fuel injection valve 105. Therefore, the valve closing time 901 can be detected by measuring the time from the timing when the injection pulse is turned off (time T505) to the inflection point 902 of the drive voltage.

The inflection point 902 appears as an extreme value 911 (maximum value or minimum value) when the time-series data of the drive voltage applied to the solenoid 407 is second-order differentiated. Therefore, the inflection point 902 can be specified by detecting the extreme value 911 of the time-series data of the drive voltage.

When the S/N ratio of the drive voltage is low and the noise level thereof is large, it is difficult to detect the extreme value from the result of the second-order differentiation of the time-series data of the drive voltage. Therefore, a desired extreme value can be detected by applying a low-pass filter or the like to the drive voltage and second-order differentiating the smoothed time-series data. The second-order differential value of the drive voltage illustrated on the lower side of FIG. 9 is obtained by filtering the time-series data of the drive voltage and performing second-order differential on the smoothed time-series data.

When the second-order differentiation is applied to the time-series data of the drive voltage from the time point (time T505) when the injection pulse is turned off, there is a possibility that the time when the voltage is switched (the time when the counter electromotive force is applied after the drive voltage is turned off) appears as an extreme value. Then, the inflection point generated by the acceleration change of the movable core 403 cannot be accurately specified.

Therefore, it is desirable that the time-series data of the drive voltage to be subjected to the second-order differentiation is time-series data of the drive voltage after the injection pulse is turned off (in other words, from the drive voltage OFF or the drive current OFF) and a certain period of time elapses. That is, it is desirable that the time-series data of the drive voltage to be subjected to the second-order differentiation be the time-series data of the drive voltage after the drive voltage is turned off and the counter electromotive force is applied.

Next, a method for calculating the valve closing time of the fuel injection valve 105 executed by the valve closing time evaluation unit 212 will be described.

Generally, the valve closing detection is performed when the injection pulse width is equal to or larger than a predetermined value. The injection pulse width prevents the valve closing detection from being executed in the bouncing region where the valve body 402 becomes unstable, so that the valve closing detection is executed when the valve body 402 becomes the full lift and is equal to or larger than the stable injection pulse width. The valve closing detection is executed a plurality of times for each cylinder when the injection pulse width becomes equal to or larger than a predetermined value, an average value thereof is output to the injection pulse width correction amount calculation unit 213 as an average valve closing time of the corresponding cylinder, and the injection pulse width correction amount calculation unit 213 changes the injection pulse width correction amount for each cylinder.

However, even in the full lift region, the movable core 403 and the valve body 402 may be unstable, and the variation in the valve closing time may increase with a specific injection pulse width depending on whether or not the holding current when the injection pulse is turned off and energization is stopped is energized.

Figure 10:
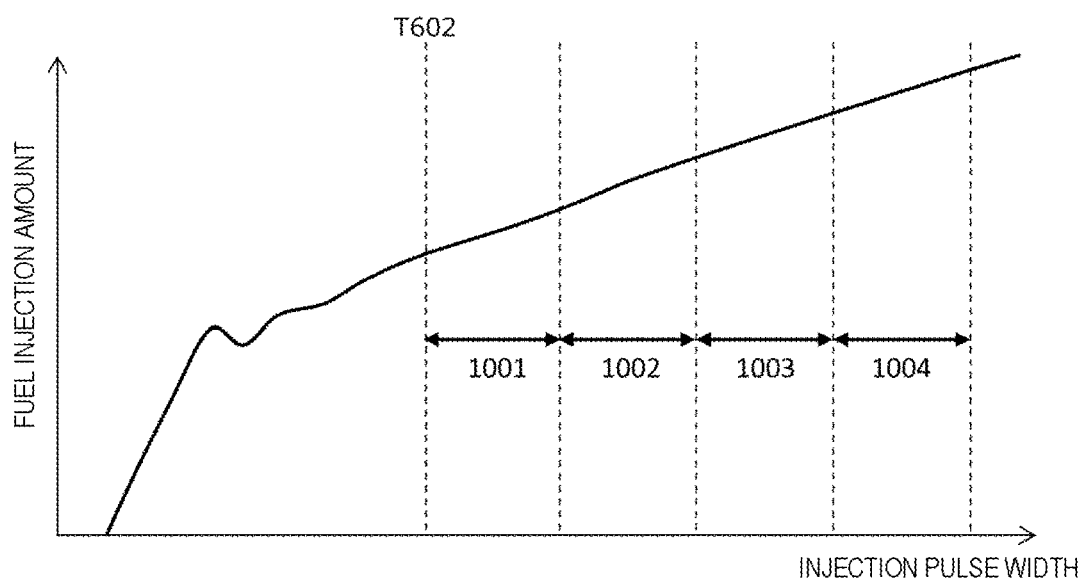
FIG. 10 is a diagram for explaining an injection pulse width interval for evaluating a valve closing detection result.

As illustrated in FIG. 10, the injection pulse width equal to or larger than a predetermined value for executing the valve closing detection is divided at predetermined time intervals (in FIG. 10, the pulse width greater than or equal to T602 is divided into four sections 1001 to 1004). Since the valve closing detection is executed when the pulse width becomes equal to or larger than T602, the injection pulse width of the target for which the valve closing detection has been executed is simultaneously stored. This operation is repeated, and the valve closing time in each pulse width section is detected a predetermined number of times or more. Thereafter, the valve closing time of each section is evaluated. The interval of the pulse width is obtained in advance by an experiment in consideration of deterioration, a valve body behavior, a holding current of energization stop, and the like.

Figure 11:
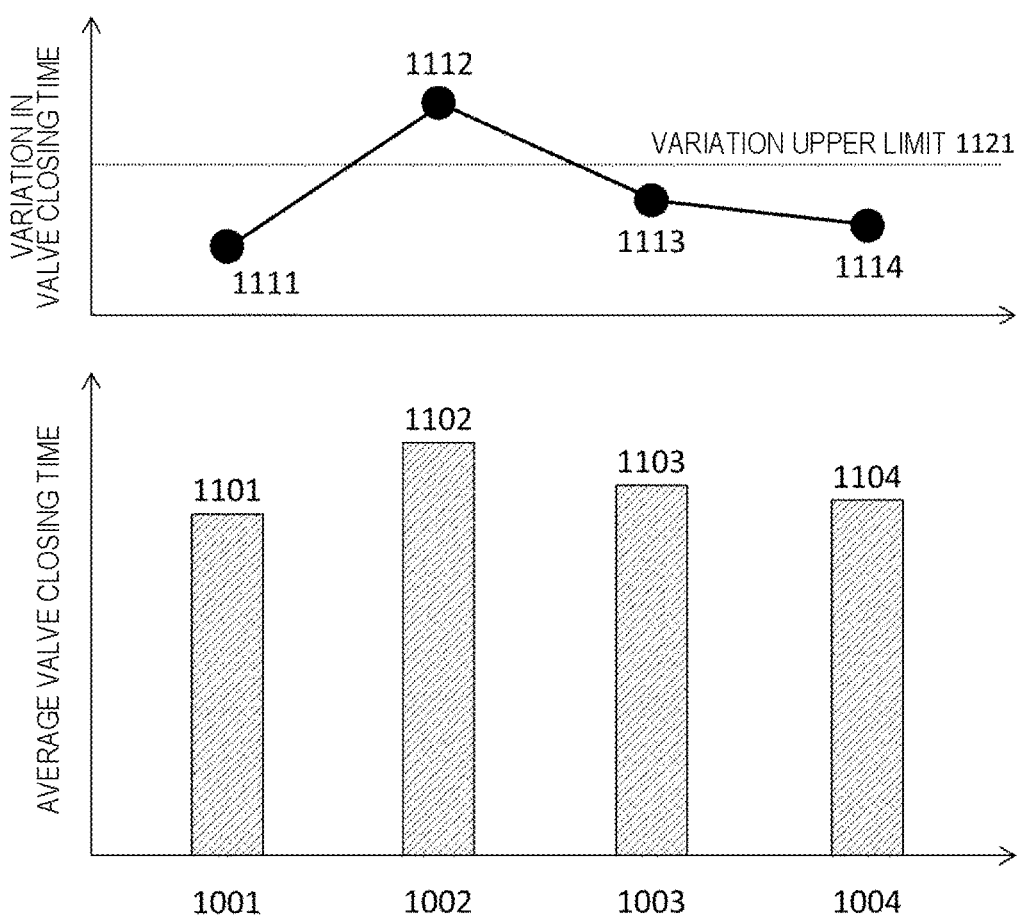
FIG. 11 is a diagram for explaining a method of evaluating a valve closing detection result for each injection pulse width interval.

The valve closing time of each section is evaluated using variations in the valve closing time of each injection pulse width section. As the variation, a standard deviation of the valve closing time measured a plurality of times, a maximum vertical width, or the like may be used. That is, as illustrated in FIG. 11, the variations 1111 to 1114 in the valve closing time of each injection pulse width section are calculated, and the valve closing time (specific valve closing time) used to calculate the injection pulse width correction amount is calculated using the average valve closing time of the sections 1001, 1003, and 1004 in which the variation is smaller than the variation upper limit value 1121. In the example illustrated in FIG. 11, the specific valve closing time can be obtained by averaging the average valve closing times 1101, 1103, and 1104. Using the specific valve closing time, the injection pulse width correction amount calculation unit 213 calculates the injection pulse width correction amount of each cylinder.

As described above, by using the average valve closing time in the section in which the variation is smaller than the predetermined variation upper limit value 1121, the valve closing detection can be performed without narrowing the pulse width region in which the valve closing detection can be performed as much as possible, and the degradation of the accuracy of the specific valve closing time can be prevented.

As the specific valve closing time, an average valve closing time of a section having the smallest variation in each pulse width section may be used. In FIG. 11, since the variation 1111 in the section 1001 is the smallest, the injection pulse width correction amount of each cylinder is calculated by the injection pulse width correction amount calculation unit 213 using the average valve closing time 1101 in the section 1001 as the specific valve closing time.

By using the average valve closing time in the section with the smallest variation as described above, there is a possibility that the number of samples for valve closing detection is reduced because the pulse width section used for valve closing detection is narrowed, but the accuracy of the specific valve closing time can be increased.

The average valve closing time may be evaluated using a change amount from the average valve closing time calculated in advance. Since the injection pulse width correction amount calculation unit 213 calculates the injection pulse width correction amount of each fuel injection valve using the average valve closing time, it is necessary to execute valve closing detection after the fuel injection valve is assembled to the internal combustion engine and store the average valve closing time of the fuel injection valve assembled to the internal combustion engine in a memory.

Using the average valve closing time at this time as an initial value, the initial value is compared with the average valve closing time in each pulse width section. The specific valve closing time is calculated using the average valve closing time of the pulse width section in which the change amount of the average valve closing time of each pulse width section from the initial value is within a predetermined value, and the injection pulse width correction amount of each cylinder is calculated by the injection pulse width correction amount calculation unit 213 based on the specific valve closing time.

When the variation in the valve closing time detected a plurality of times in a certain pulse width section is small but the average valve closing time greatly varies from the initial value, the average valve closing time in the pulse width section is not used for the calculation of the specific valve closing time by the evaluation based on the change amount from the initial value, so that the degradation of the accuracy of the specific valve closing time can be prevented.

The initial value of the average valve closing time may be obtained by performing valve closing detection a plurality of times in a section where variation in valve closing time defined in advance by an experiment is small and calculating an average value of each valve closing time.

The allowable range of the change amount from the initial value of the average valve closing time may be determined according to the deterioration state of the fuel injection valve. The deterioration of the fuel injection valve progresses as the number of times of driving increases, and the set spring 408 becomes weak. Therefore, as the deterioration of the fuel injection valve progresses, the valve closing time becomes longer. Therefore, the change amount allowable range from the initial value is changed according to the deterioration characteristics clarified in advance by the experiment.

Furthermore, the valve closing detection is executed during a period from the start to the stop of the internal combustion engine, and the initial value is updated with the average valve closing time calculated during the period, so that the average valve closing time may be evaluated by the amount of change from the last stored average valve closing time.

Since the valve closing time varies depending on the fuel pressure, the average valve closing time may be evaluated for each fuel pressure in the same injection pulse width section.

SUMMARY

In the present embodiment, in a fuel injection control device 127 that controls a plurality of fuel injection valves 105 in which a valve body moves from a valve closing position to a valve opening position by energizing a solenoid 407, wherein the device is configured to measure, as a valve closing time, a time from when energization of the solenoid 407 is finished to when the valve body 402 moves to the valve closing position for each of the plurality of fuel injection valves 105; divide an energization time of the solenoid 407 into a plurality of sections 1001 to 1004; calculate, as an average valve closing time, an average value of the valve closing times measured a plurality of times in each section; calculate a specific valve closing time based on the average valve closing time of at least one section among the plurality of sections 1001 to 1004; and correct the energization time according to the specific valve closing time of each of the plurality of fuel injection valves 105.

According to the present embodiment configured as described above, the energization time (injection pulse width) of the solenoid 407 of each fuel injection valve 105 is divided into the plurality of sections 1001 to 1004, the specific valve closing time of each fuel injection valve 105 is calculated based on at least one of the average valve closing times of the sections, and the variation in the specific valve closing time of each fuel injection valve 105 is detected as the individual difference of the fuel injection valve 105. As a result, the execution frequency and the accuracy of the individual difference detection of the plurality of fuel injection valves 105 can be improved.

The fuel injection control device 127 according to the present embodiment calculates the specific valve closing time based on the average valve closing time of the sections 1001, 1003, and 1004 in which the variations 1111 to 1114 in the valve closing time is equal to or less than a predetermined value 1121 among the plurality of sections 1001 to 1004. This makes it possible to improve the accuracy of the specific valve closing time.

The fuel injection control device 127 according to the present embodiment calculates the average valve closing time in the section 1001 having the smallest variation in the valve closing time among the plurality of sections 1001 to 1004 as the specific valve closing time. This makes it possible to further improve the accuracy of the specific valve closing time.

The fuel injection control device 127 according to the present embodiment stores the average valve closing time calculated in advance for each of the plurality of sections 1001 to 1004 as a reference average valve closing time (initial value), and calculates the specific valve closing time based on the average valve closing time of a section in which a change amount of the average valve closing time from the reference average valve closing time is within a predetermined range among the plurality of sections 1001 to 1004. As a result, when the average valve closing time greatly fluctuates from the reference average valve closing time (initial value), the average valve closing time in the pulse width section is not used for the calculation of the specific valve closing time by the evaluation based on the change amount from the initial value, so that the degradation of the accuracy of the specific valve closing time can be prevented.

The fuel injection control device 127 according to the present embodiment changes the predetermined range according to the number of times of driving of the plurality of fuel injection valves 105. As a result, it is possible to improve the accuracy of the specific valve closing time while allowing the change in the valve closing time due to the deterioration of the fuel injection valve 105.

The fuel injection control device 127 according to the present embodiment calculates the specific valve closing time for each fuel pressure. This makes it possible to suppress variations in the fuel injection amount of each fuel injection valve 105 regardless of the fuel pressure.

Although the embodiments of the present invention have been described in detail above, the present invention is not limited to the above-described embodiments, and includes various modifications. For example, the above-described embodiments have been described in detail in order to describe the present invention in an easy-to-understand manner, and are not necessarily limited to those having all the described configurations.

REFERENCE SIGNS LIST

101 internal combustion engine (engine)
102 piston
103 intake valve
104 exhaust valve
105, 105P, 105S, 105P fuel injection valve
106 ignition plug
107 ignition coil
108 water temperature sensor
110 intake pipe
111 exhaust pipe
112 three-way catalyst
113 oxygen sensor
115 collector
116 crank angle sensor
119 throttle valve
120 air flow meter (AFM)
120 air flow meter
121 combustion chamber
122 accelerator opening sensor
123 fuel tank
124 low-pressure fuel pump
125 high-pressure fuel pump
126 fuel pressure sensor
127 fuel injection control device
128 exhaust cam
129 high-pressure fuel pipe
131 crank shaft
142 memory
201 fuel injection pulse signal calculation unit
202 fuel injection drive waveform command unit
203 engine state detection unit
204 fuse
205 relay
205a actuator
206 high-voltage generation unit (boosting device)
206 high-voltage generation unit
207a fuel injection drive unit
207b fuel injection drive unit
208 drive IC
209 battery voltage
210 high voltage (power supply voltage)
211 valve closing time detection unit
212 valve closing time evaluation unit
213 injection pulse width correction amount calculation unit
301, 302 diode
303 high-voltage side switching element
304 low-voltage side switching element
305 switching element
306 shunt resistor
308, 309 diode
401 housing
402 valve body
402a distal end portion
402b rear end portion
403 movable core
403a through hole
404 fixed core
405 valve seat
406 injection hole
407 solenoid
408 set spring
409 zero spring
611, 612, 701 to 703 injection amount characteristic
710 required injection amount
711 to 713 injection pulse width
801 to 803 valve closing time
812, 813 correction value
901 valve closing time
902 inflection point
911 extreme value
1001 to 1004 section
1101 to 1104 average valve closing time
1111 to 1114 variation
1121 variation upper limit value

The invention claimed is:

1. A fuel injection control device that controls a plurality of fuel injection valves in which a valve body moves from a valve closing position to a valve opening position by energizing a solenoid, wherein the device is configured to
    measure, as a valve closing time, a time from when energization of the solenoid is finished to when the valve body moves to the valve closing position for each of the plurality of fuel injection valves;
    divide an energization time of the solenoid into a plurality of sections;
    calculate, as an average valve closing time, an average value of the valve closing times measured a plurality of times in each of the plurality of sections;
    calculate a specific valve closing time based on the average valve closing time of at least one section among the plurality of sections; and
    correct the energization time according to the specific valve closing time of each of the plurality of fuel injection valves,
    wherein the fuel injection control device calculates the specific valve closing time based on the average valve closing time in a section in which a variation in the valve closing time is a predetermined value or less among the plurality of sections.

2. A fuel injection control device that controls a plurality of fuel injection valves in which a valve body moves from a valve closing position to a valve opening position by energizing a solenoid, wherein the device is configured to
    measure, as a valve closing time, a time from when energization of the solenoid is finished to when the valve body moves to the valve closing position for each of the plurality of fuel injection valves;

divide an energization time of the solenoid into a plurality of sections;

calculate, as an average valve closing time, an average value of the valve closing times measured a plurality of times in each of the plurality of sections;

calculate a specific valve closing time based on the average valve closing time of at least one section among the plurality of sections; and correct the energization time according to the specific valve closing time of each of the plurality of fuel injection valves, wherein the fuel injection control device calculates the average valve closing time, as the specific valve closing time, in a section in which a variation of the valve closing time is the smallest among the plurality of sections.

3. A fuel injection control device that controls a plurality of fuel injection valves in which a valve body moves from a valve closing position to a valve opening position by energizing a solenoid, wherein the device is configured to measure, as a valve closing time, a time from when energization of the solenoid is finished to when the valve body moves to the valve closing position for each of the plurality of fuel injection valves;

divide an energization time of the solenoid into a plurality of sections;

calculate, as an average valve closing time, an average value of the valve closing times measured a plurality of times in each of the plurality of sections;

calculate a specific valve closing time based on the average valve closing time of at least one section among the plurality of sections; and correct the energization time according to the specific valve closing time of each of the plurality of fuel injection valves, wherein the fuel injection control device stores the average valve closing time calculated in advance for each of the plurality of sections as a reference average valve closing time, and calculates the specific valve closing time based on the average valve closing time of a section in which a change amount of the average valve closing time from the reference average valve closing time is within a predetermined range among the plurality of sections.

4. The fuel injection control device according to claim 3, wherein the fuel injection control device changes the predetermined range according to the number of times of driving of the plurality of fuel injection valves.

5. The fuel injection control device according to claim 1, wherein the fuel injection control device calculates the specific valve closing time for each fuel pressure.

6. The fuel injection control device according to claim 2, wherein the fuel injection control device calculates the specific valve closing time for each fuel pressure.

7. The fuel injection control device according to claim 3, wherein the fuel injection control device calculates the specific valve closing time for each fuel pressure.

* * * * *